United States Patent
Ihara (10) Patent No.: US 7,127,263 B1
(45) Date of Patent: Oct. 24, 2006

(54) PRIVATE BRANCH EXCHANGE SYSTEM

(75) Inventor: Takanobu Ihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/551,547

(22) Filed: Apr. 18, 2000

(30) Foreign Application Priority Data

Apr. 19, 1999 (JP) ................. 11-110930

(51) Int. Cl.
*H04Q 7/20* (2006.01)
*H04M 1/00* (2006.01)

(52) U.S. Cl. ................. 455/465; 455/426.2; 455/554.1; 455/555; 379/232

(58) Field of Classification Search ................. 455/414, 455/417, 418, 426, 461, 462, 554, 555, 550, 455/554.1, 426.1, 426.2, 456; 379/156, 198, 379/225, 232, 234, 157
See application file for complete search history.

(56) References Cited

U.S. PATENT DOCUMENTS

| | | | | |
|---|---|---|---|---|
| 5,375,162 A * | 12/1994 | Kim et al. | ................. | 340/7.29 |
| 5,379,339 A * | 1/1995 | Sakamoto | ................. | 455/461 |
| 5,481,590 A * | 1/1996 | Grimes | ................. | 340/7.21 |
| 5,517,551 A * | 5/1996 | Arai | ................. | 455/566 |
| 5,544,226 A | 8/1996 | Weis et al. | | |
| 5,544,227 A | 8/1996 | Blust et al. | | |
| 5,594,777 A | 1/1997 | Makkonen et al. | | |
| 5,734,699 A | 3/1998 | Lu et al. | | |
| 5,757,902 A * | 5/1998 | Mitsuo | ................. | 379/212.01 |
| 5,771,465 A * | 6/1998 | Bojeryd | ................. | 455/554 |
| 5,797,091 A * | 8/1998 | Clise et al. | ................. | 455/404.2 |
| 5,839,067 A * | 11/1998 | Jonsson | ................. | 455/432.3 |
| 5,841,854 A * | 11/1998 | Schumacher et al. | .. | 379/265.11 |
| 5,978,667 A * | 11/1999 | Suzuki et al. | ................. | 455/403 |
| 6,021,176 A * | 2/2000 | McKendry et al. | ................. | 379/35 |
| 6,134,431 A * | 10/2000 | Matsumoto et al. | ................. | 455/411 |
| 6,212,377 B1 * | 4/2001 | Dufour et al. | ................. | 455/426.2 |
| 6,223,055 B1 * | 4/2001 | Cyr | ................. | 455/555 |
| 6,289,089 B1 * | 9/2001 | Rippstein | ................. | 379/156 |
| 6,321,084 B1 * | 11/2001 | Horrer | ................. | 455/431 |

FOREIGN PATENT DOCUMENTS

| | | |
|---|---|---|
| AU | 0529359 A2 | 3/1993 |
| JP | 61-65654 | 9/1984 |
| JP | 61-242446 | 10/1986 |
| JP | 02-069094 | 3/1990 |
| JP | 03-285490 | 12/1991 |
| JP | 07-030656 | 1/1995 |
| JP | 07-274255 | 10/1995 |
| JP | 8149557 A * | 6/1996 |
| JP | 08-228384 | 9/1996 |
| JP | 08-289040 | 11/1996 |
| JP | 09-009354 | 1/1997 |
| JP | 09-028440 | 2/1997 |
| JP | 09-084137 | 3/1997 |
| JP | 10-327437 | 12/1998 |
| JP | 10-327467 | 12/1998 |

\* cited by examiner

*Primary Examiner*—Tilahun Gesesse
(74) *Attorney, Agent, or Firm*—Foley & Lardner LLP (57) ABSTRACT

Each of a plurality of mobile stations is provided with a plurality of extension numbers including at least one unique extension number, and different lines are set for the plurality of extension numbers respectively. This enables a call using a line even when another call is made using another line.

26 Claims, 7 Drawing Sheets

PRIVATE BRANCH EXCHANGE SYSTEM

BACKGROUND OF THE INVENTION

1. Field of the Invention

The present invention relates to a private branch exchange system, and more particularly to a private branch exchange system using a plurality of mobile stations.

2. Description of the Related Art

Conventionally, in a private branch exchange system, one department is assigned one or a plurality of extension numbers which are used to make a wired-based call on the premises.

However, in such a private branch exchange system, since one department is simply assigned one or a plurality of extension numbers, a telephone call intended for a user belonging to the department may be answered by another user. In this case, extra time is required for putting the intended user on the line.

Additionally, when a called party is away from his desk, a calling party must make a call again.

To address these disadvantages, in recent years, a private branch exchange system is contemplated in which each user of the private branch exchange system is assigned one mobile station for performing wireless communication. It is thus possible to eliminate the time taken for putting an intended user on the line and to receive an incoming call even when a user is away from his desk.

Mobile stations assigned to respective users have different extension numbers respectively which are used to make a call among the mobile stations.

In the prior art private branch exchange system using mobile stations as mentioned above, each user of the private branch exchange system is assigned one mobile station having a unique extension number, so that a common extension number throughout one department is not provided as in the prior art wired private branch exchange system.

Thus, in the case of a call directed to a department, a mobile station is called by using an extension number of one of users belonging to the department. If the mobile station is busy or outside a service area, a disadvantage occurs in that another mobile station is called by using an extension number of another user belonging to the department.

Additionally, a disadvantage exists in that, if a mobile station is busy, a caller must make another call later since one mobile station is assigned only one extension number.

When a mobile station is busy or outside a service area, a call directed thereto may be transferred to another mobile station. However, the transfer function depends on the setting operations by a user, and the disadvantages as mentioned above occur if a user has forgotten to set the transfer function.

SUMMARY OF THE INVENTION

It is an object of the present invention to provide a private branch exchange system which assigns a plurality of extension numbers to a plurality of mobile stations to reduce the frequency with which a call is again originated and to allow services similar to those of a wired private branch exchange system.

In the present invention, a plurality of extension numbers including at least one unique extension number are provided for each of a plurality of mobile stations, and different lines are set for the respective extension numbers. Thus, even when one line is used for a call, another line can be used to make another call.

When at least one of a plurality of extension numbers set for a plurality of mobile stations is a common extension number to the mobile stations in the same department, a caller may call that extension number if he attempts to call the department, which translates into a call to a mobile station of any one of users belonging to the department. In this manner, services similar to those in the wired prior art private branch exchange system can be provided.

When each of a plurality of mobile stations is provided with a transfer function for transferring an incoming call at a line to another line, a call can be received even when another call is in progress if previous setting is performed such that an incoming call at a line during use for another call is transferred to another line.

The above and other objects, features, and advantages of the present invention will become apparent from the following descriptions with reference to the accompanying drawings which illustrate examples of the present invention.

DETAILED DESCRIPTION OF THE PREFERRED EMBODIMENT

Figure 1:
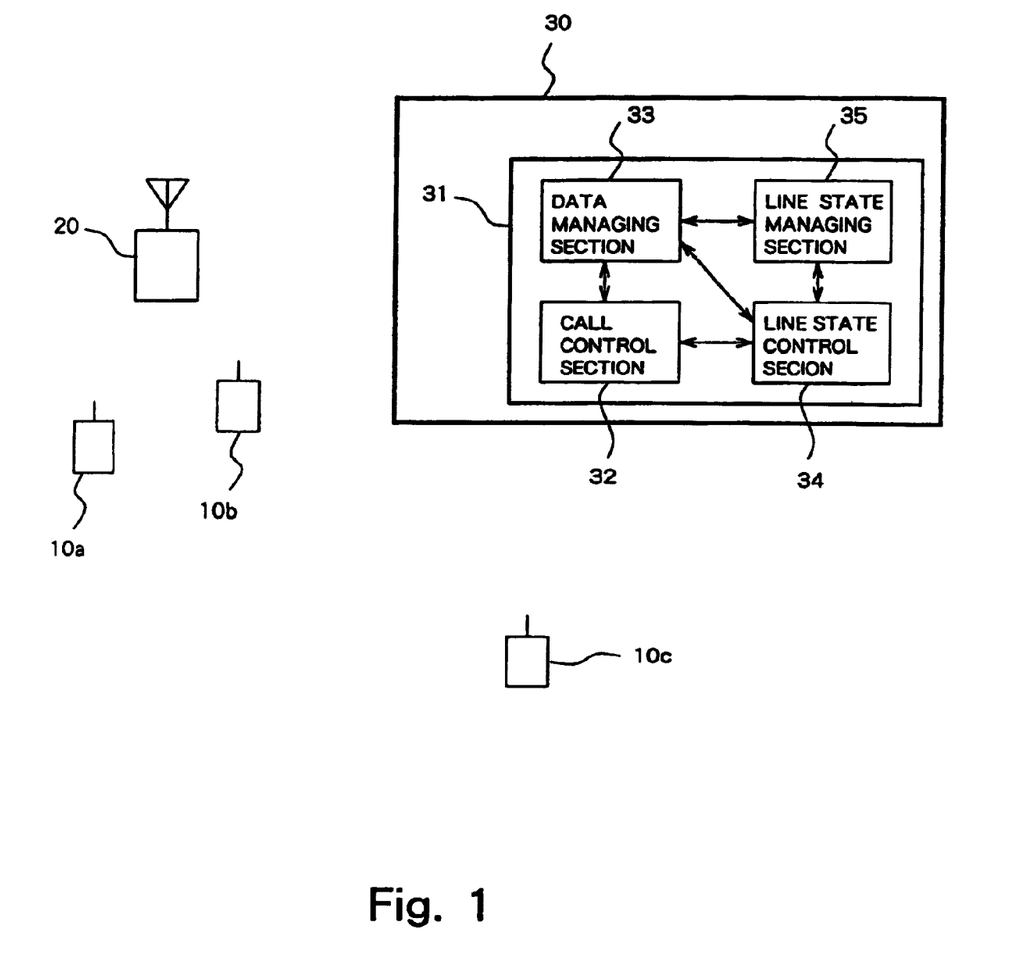
FIG. 1 is a diagram showing an embodiment of a private branch exchange system of the present invention.

Referring to FIG. 1, the present embodiment comprises a plurality of mobile stations 10a to 10c, base station 20 wirelessly connected to mobile stations 10a to 10c, and exchange station 30 for performing call control of mobile stations 10a to 10c through base station 20. Each of mobile stations 10a to 10c has a plurality of extension numbers including a unique extension number and other extension numbers, thereby allowing the setting of a plurality of telephone lines. It should be noted that a line set with a unique extension number is referred to as a "personal line" in a mobile station, and lines set with other extension numbers are referred to as "sublines" in the mobile station. For example, as extension numbers for setting personal lines, number 2000 is set for mobile station 10a, number 3000 for mobile station 10b, and number 4000 for mobile station 10c. As an extension number for setting a subline, number 5000 is set in common for mobile stations 10a to 10c to allow the number 5000 to be used as a common extension number of mobile stations 10a to 10c. Alternatively, as extension numbers for setting sublines, number 5000 is set in common for mobile stations 10a and 10b, and number 6000 is set for mobile station 10c unlike mobile stations 10a and 10b, so that mobile station 10c has two set extension numbers not in common with other mobile stations 10a and 10b.

When one mobile station has two extension numbers not in common with other mobile stations as mentioned above, the two numbers can be individually used such that the one is transmitting and the other is receiving.

Mobile stations 10a to 10c are provided with a transfer function (not shown). When one mobile station has two extension numbers not in common with other mobile stations as mentioned above, a call can be received even when another call is in progress if a previous setting is made such that an incoming call to a line in use is transferred to another line.

Provided in CPU 31, serving as control means for controlling the operations of exchange station 30, has a control section 32, data managing section 33, line state control section 34 and managing section 35.

Control section 32 performs call control of mobile stations 10a to 10c. Data managing section 33 manages information for each extension number manages in the private branch exchange system. Line state managing section 35 managing the states of telephone lines in the private branch exchange system. Line state control section 34 controls the states of telephone lines using the information managed by data managing section 33 and line state managing section 35 based on the operations at mobile stations 10a to 10c.

While one base station 20 and three mobile stations 10a to 10c are provided in FIG. 1, the numbers of the base station and the mobile stations are not limited thereto.

Figure 2:
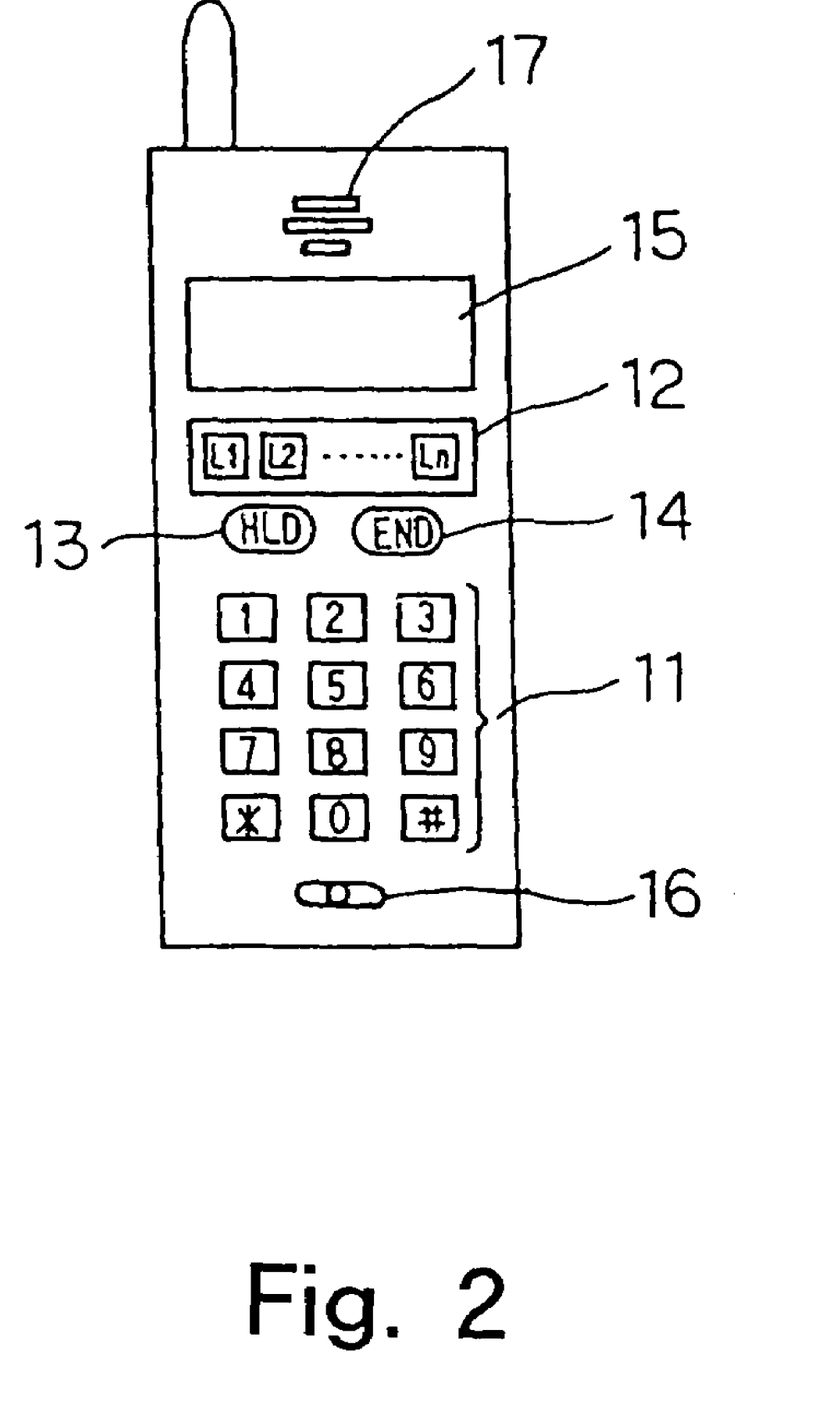
FIG. 2 is a diagram for explaining an arrangement of a mobile station shown in FIG. 1.

As shown in FIG. 2, each of mobile stations 10a to 10c in the embodiment is provided with numeric keypad 11 for input of data such as numerals, line keys 12 for setting a telephone line for each extension number possessed by mobile stations 10a to 10c, reserve button 13 for suspending a call, end key 14 for terminating a call, display portion 15 for displaying information, microphone 16 for receiving voice information, and speaker 17 for outputting voice information.

Each of mobile stations 10a to 10c has keys in line keys 12 corresponding to the number of extension numbers possessed by the mobile station (in the embodiment, the total number n of line key L1 for setting a personal line and line keys L2 to Ln for setting sublines). The pressing of an appropriate key allows a call to be made using a line corresponding to the key.

Figure 3:
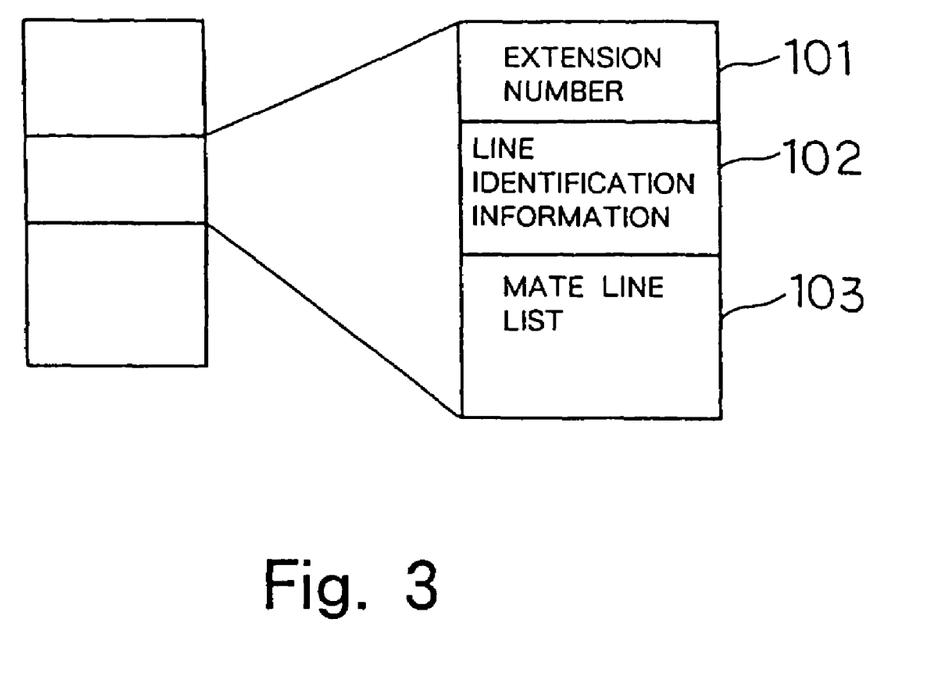
FIG. 3 is a diagram showing a data arrangement managed by a data managing section shown in FIG. 1.

As shown in FIG. 3, data managing section 33 manages data which comprises extension number 101 managed by the private branch exchange system, manages line identification information 102 for identifying if extension number 101 is for setting a personal line or a subline, and manages mate line list 103 which, if extension number 101 is an extension number for setting a personal line, stores an extension number provided for setting a subline in a mobile station which uses the former extension number to set its personal line, and which, if extension number 101 is an extension number for setting a subline, stores an extension number provided for setting a personal line in a mobile station which uses the former extension number to set its subline. The number of sets of such stored data is equal to the number of extension numbers managed by the private branch exchange system.

Figure 4:
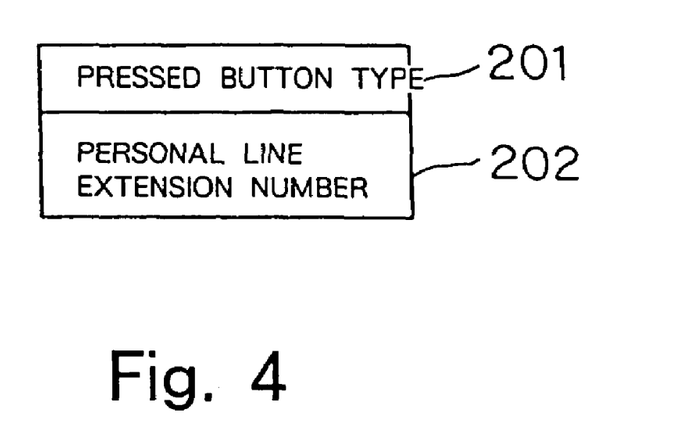
FIG. 4 is a diagram showing a format of a signal sent from a mobile station to an exchange station when a line key or reserve button shown in FIG. 2 is pressed.

As shown in FIG. 4, when line key 12 or reserve button 13 of one of mobile stations 10a to 10c (see FIG. 1) is pressed, exchange station 30 (see FIG. 1) is provided with a signal comprising pressed button type 201 for indicating the type of the pressed button and personal line extension number 202 for setting a personal line of the one of mobile stations 10a to 10c (see FIG. 1) whose button has been pressed.

Description will be hereinafter made for call control operations in the private branch exchange system configured as described above with reference to FIG. 1 and FIG. 2.

First, operations in the case of originating a call using a personal line in mobile stations 10a to 10c with no call present in mobile stations 10a to 10c are described using an example where mobile station 10a originates a call to mobile station 10b.

When an extension number of mobile station 10b which is a called party is input through numeric keypad 11 of mobile station 10a the inputted extension number is sent to exchange station 30 through base station 20. Thereafter, call control section 32 in exchange station 30 performs call origination processing on mobile station 10b having the sent extension number.

Next, operations for receiving a call at a personal line of mobile stations 10a to 10c with no call present in mobile stations 10a to 10c are described using an example of operations for receiving a call at a personal line of mobile station 10c.

When no call is present at mobile station 10c, the call reception at the personal line of mobile station 10c is made such that call control section 32 in exchange station 30 performs call origination processing based on the manipulations at calling mobile station 10a or 10b to achieve the call reception at the personal line of mobile station 10c.

Next, operations when line key 12 or reserve button 13 is pressed at one of mobile stations 10a to 10c with a call present in the one of mobile stations 10a to 10c are described using an example where line key 12 or reserve button 13 is pressed at mobile station 10a.

When line key 12 or reserve button 13 is pressed at mobile station 10a with a call present at mobile station 10a, such information as shown in FIG. 4 is sent from mobile station 10a to exchange station 30 through base station 20.

The information sent to exchange station 30 is sent to line state control section 34 through call control section 32 in exchange station 30.

Line state control section 34 extracts all the extension numbers set for mobile station 10a from the data managed by data managing section 33 based on the information sent from mobile station 10a.

Next, line state control section 34 extracts the states of the lines set with the extension numbers extracted from data managing section 33 from the information managed by line state managing section 35.

Thereafter, line state control section 34 selects call processing based on the states of the lines extracted from line state managing section 35 and the type of the pressed button sent from mobile station 10a, and call control section 32 performs the call processing selected by line state control section 34.

In the following, the aforementioned operations are described with specific examples.

Figure 5:
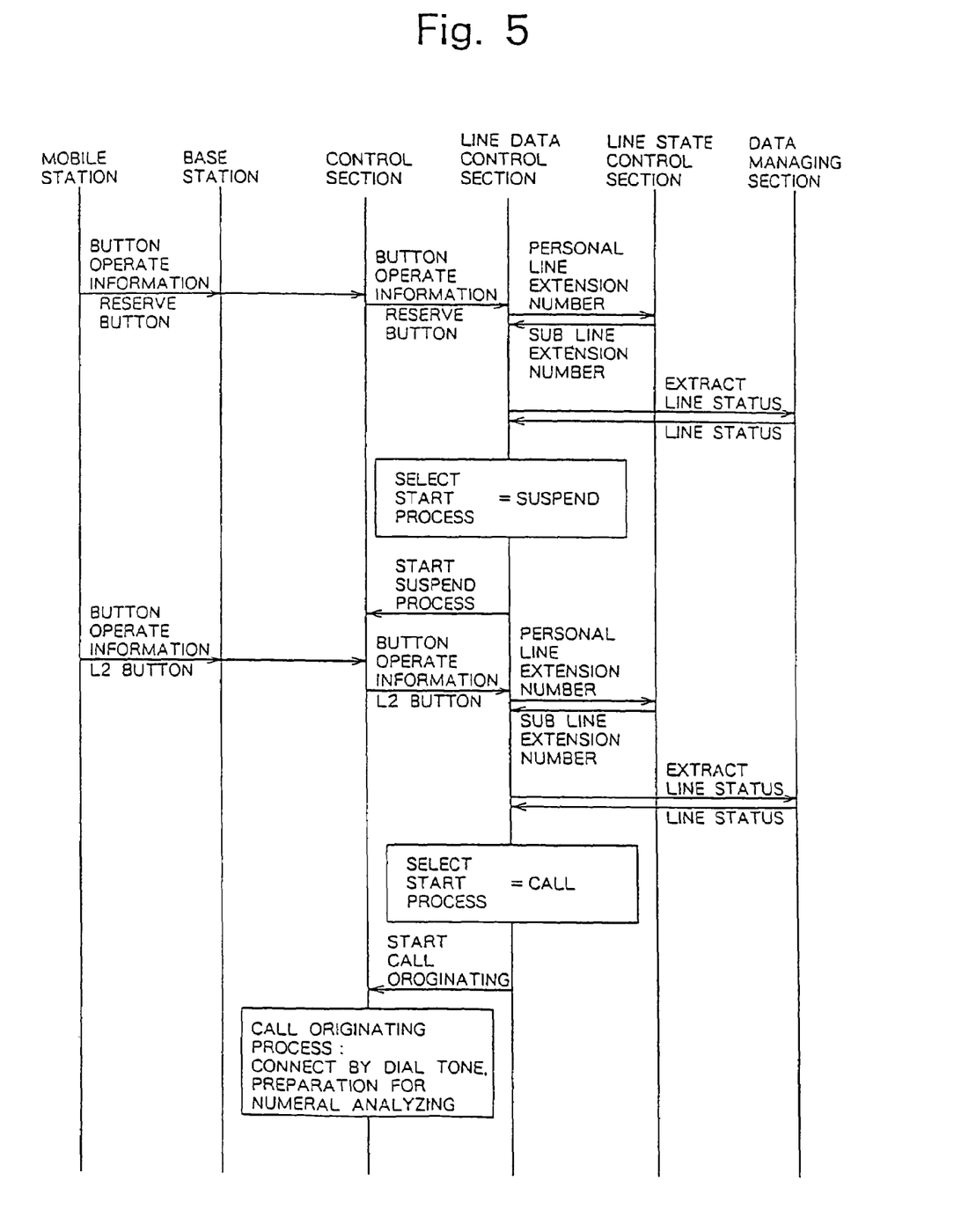
FIG. 5 is a diagram for explaining an example of call control operations in the private branch exchange system shown in FIG. 1 to FIG. 4.

First, description is made for the operations when mobile station 10a suspends its personal line set with line key L1 during a call using the personal line to originate a call using a subline set with line key L2, with reference FIG. 5.

When reserve button 13 is pressed at mobile station 10a during a call using the personal line set with line key L1, such information as shown in FIG. 4 is sent from mobile station 10a to exchange station 30 through base station 20. In this case, pressed button type 201 shown in FIG. 4 is the reserve button, and an associated extension number is the extension number for setting the personal line at mobile station 10a.

The information sent to exchange station 30 is sent to line state control section 34 through call control section 32 in exchange station 30.

Then, line state control section 34 extracts all the extension numbers set for mobile station 10a from the data managed by data managing section 33 based on the information sent from mobile station 10a. Specifically, all the extension numbers for setting sublines stored in mate line list 103 accompanied with the extension number for setting the personal line at mobile station 10a are extracted.

Next, line state control section 34 extracts the states of the lines set with the extension numbers extracted from data managing section 33 from the information managed by line state managing section 35. In this case, the extracted information includes "communicating" for L1 and "empty" for other lines.

Next, line state control section 34 selects call processing based on the states of the lines extracted from line state managing section 35 and pressed button type 201 sent from mobile station 10a. In this case, since pressed button type 201 is the reserve button, it is determined that a user of mobile station 10a desires to suspend a call.

Thereafter, call control section 32 performs call suspending processing set with line key L1 under the control of line state control section 34, thereby suspending the call set with line key L1.

After the call is suspended, when line key L2 is pressed at mobile station 10a, such information as shown in FIG. 4 is sent from mobile station 10a to exchange station 30 through base station 20. In this case, pressed button type 201 shown in FIG. 4 is L2 button and an associated extension number is the extension number for setting the personal line at mobile station 10a.

The information sent to exchange station 30 is sent to line state control section 34 through call control section 32 in exchange station 30.

Then, line state control section 34 extracts all the extension numbers set for mobile station 10a from the data managed by data managing section 33 based on the information sent from mobile station 10a. Specifically, all the extension numbers for setting sublines stored in mate line list 103 accompanied with the extension number for setting the personal line at mobile station 10a are extracted.

Next, line state control section 34 extracts the states of the lines set with the extension numbers extracted from data managing section 33 from the information managed by line state managing section 35. In this case, the extracted information includes "suspending" for L1 and "empty" for other lines.

Next, line state control section 34 selects call processing based on the states of the lines extracted from line state managing section 35 and pressed button type 201 sent from mobile station 10a. In this case, since pressed button type 201 is L2 button, it is determined that the user of mobile station 10a desires to originate a call using the line set with line key L2.

Thereafter, call control section 32 performs call originating processing set with line key L2 under the control of line state control section 34, thereby originating a call set with line key L2.

Figure 6:
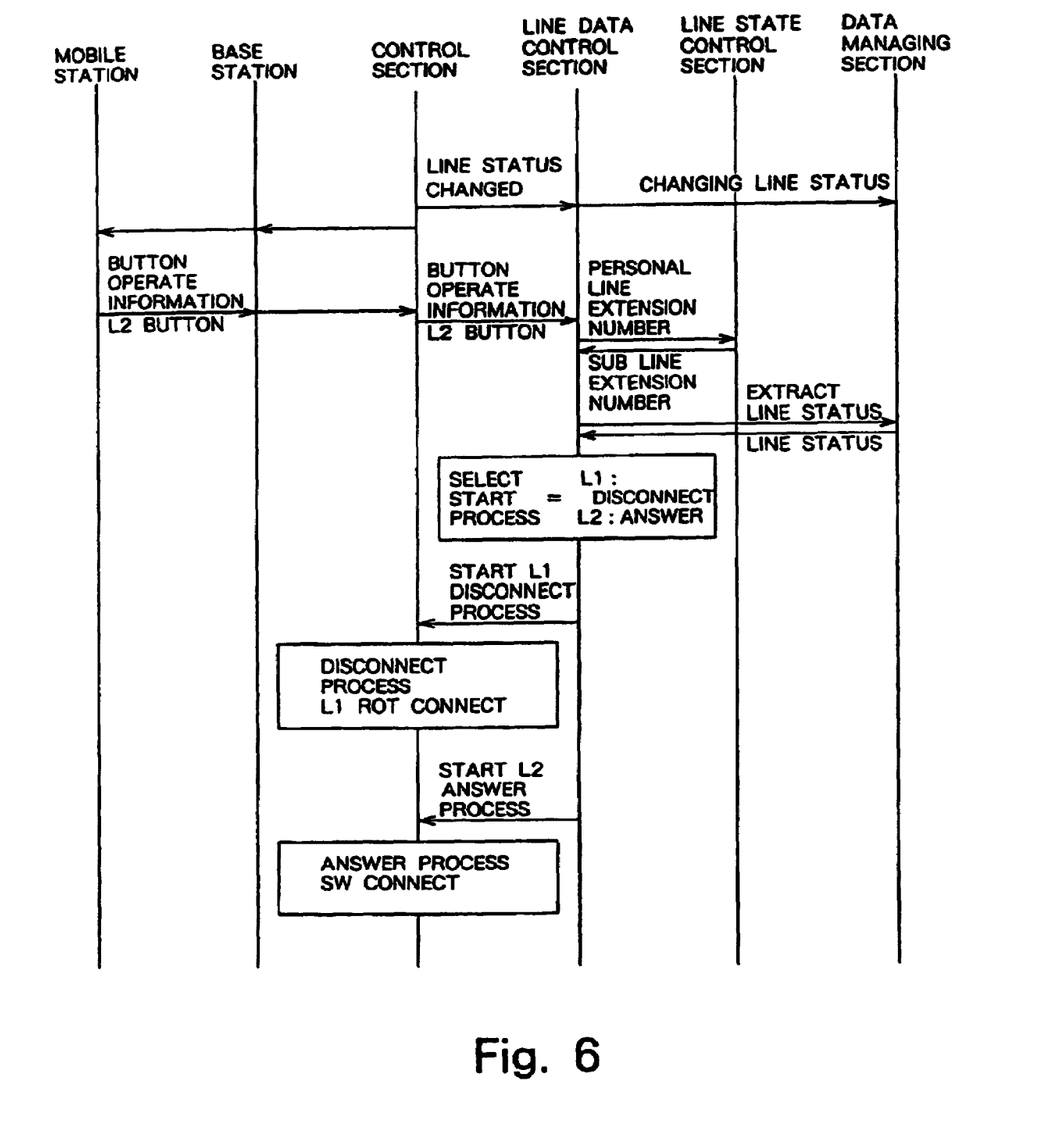
FIG. 6 is a diagram for explaining an example of call control operations in the private branch exchange system shown in FIG. 1 to FIG. 4.

Next, description is made for the operations when a user receives an incoming call at mobile station 10a through a subline set with line key L2 during a call using a personal line set with line key L1 and then answers the incoming call of the subline set with line key L2 without suspending the personal line, with reference FIG. 6.

When an incoming call occurs at the subline set with line key L2 of mobile station 10a during a call using the personal line set with line key L1 at mobile station 10a, the incoming call is notified from call control section 32 in exchange station 30 to mobile station 10a through base station 20.

The aforementioned incoming call is also notified from call control section 32 to line state control section 34 which rewrites the state of a line set with line key L2 of mobile station 10a out of lines managed by line state managing section 35.

Thereafter, line key L2 is pressed at mobile station 10a, such information as shown in FIG. 4 is sent from mobile station 10a to exchange station 30 through base station 20. In this case, pressed button type 201 shown in FIG. 4 is L2 button, and an associated extension number is the extension number for setting the personal line at mobile station 10a.

The information sent to exchange station 30 is sent to line state control section 34 through call control section 32 in exchange station 30.

Then, line state control section 34 extracts all the extension numbers set for mobile station 10a from the data managed by data managing section 33 based on the information sent from mobile station 10a. Specifically, all the extension numbers for setting sublines stored in mate line list 103 accompanied with the extension number for setting the personal line at mobile station 10a are extracted.

Next, line state control section 34 extracts the states of the lines set with the extension numbers extracted from data managing section 33 from the information managed by line state managing section 35. In this case, the extracted information includes "communicating" for L1, "receiving" for L2, and "empty" for other lines.

Next, line state control section 34 selects call processing based on the states of the lines extracted from line state managing section 35 and pressed button type 201 sent from mobile station 10a. In this case, since pressed button type 201 is L2 button, it is determined that a user of mobile station 10a desires to disconnect the communication using the line set with line key L1 to answer the incoming call through the line set with line key L2.

Thereafter, call control section 32 performs processing for disconnecting the communication using the line set with line key L1 and response processing to the incoming call through the line set with line key L2 under the control of line state control section 34, thereby responding to the incoming call through the line set with line key L2.

In this manner, line state control section 34 may cause call control section 32 to perform a plurality of call control processing for one event.

Figure 7:
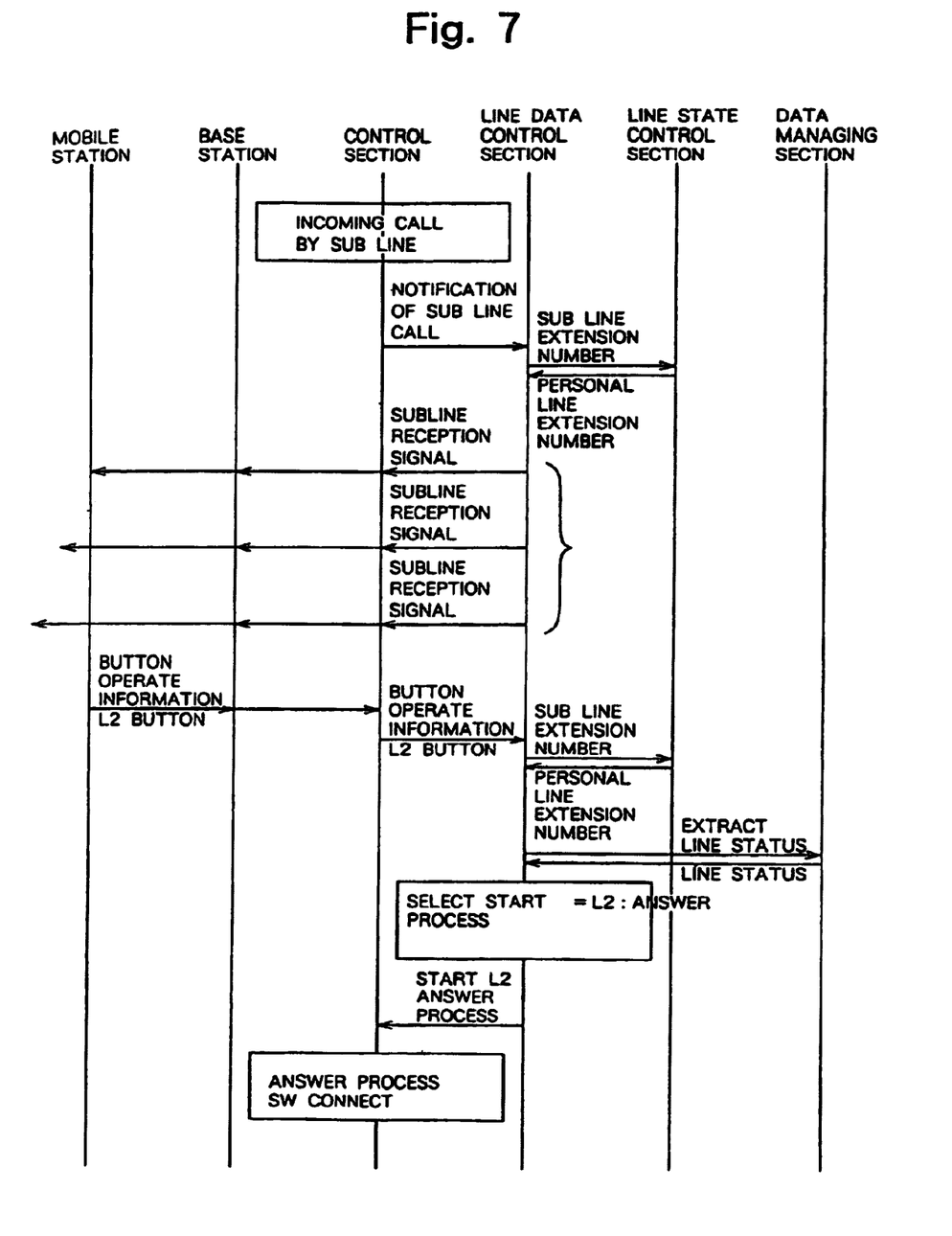
FIG. 7 is a diagram for explaining an example of call control operations in the private branch exchange system shown in FIG. 1 to FIG. 4.

Next, description is made for the operations when an incoming call occurs at a subline of mobile stations 10a to 10c and mobile station 10a answers the incoming call.

When an incoming call directed to a subline occurs in call control section 32 in exchange station 30, call control section 32 transmits a notification of subline call reception to line state control section 34.

Then, line state control section 34 extracts all the extension numbers set for personal lines of mobile stations 10a to 10c which have the extension number specified by a calling mobile station for setting a subline from the data managed by data managing section 33. Specifically, in the data as shown in FIG. 3 managed by data managing section 33, all the extension numbers for setting the personal lines of mobile stations 10a to 10c which have the extension number specified by the calling mobile station for setting a subline are extracted from mate line list 103 accompanied with extension number 101 being the extension number specified by the calling mobile station.

Next, the state of the line of the subline specified by the calling mobile station is rewritten to "receiving" out of the lines managed by line state managing section 35.

Line state control section 34 sends to call control section 32, based on the extension numbers extracted from the data managing section 33, a direction for sending a subline reception signal to mobile stations 10a to 10c which have the extension number for setting its personal line.

Thereafter, call control section 32 notifies the subline reception to mobile stations 10a to 10c which have the extension number extracted from data managing section 33.

When line key L2 for setting that subline is pressed at mobile station 10a of mobile stations 10a to 10c which have been notified of the subline reception, such information as shown in FIG. 4 is sent from mobile station 10a to exchange station 30 through base station 20. In this case, pressed button type 202 shown in FIG. 4 is L2 button, and an associated extension number is the extension number for setting the personal line at mobile station 10a.

The information sent to exchange station 30 is sent to line state control section 34 through call control section 32 in exchange station 30.

Line state control section 34 extracts all the extension numbers set for mobile station 10a from the data managed by data managing section 33 based on the information sent from mobile station 10a. Specifically, all the extension numbers for setting sublines stored in mate line list 103 accompanied with the extension number for setting the personal line at mobile station 10a are extracted.

Next, line state control section 34 extracts the states of the lines set with the extension numbers extracted from data managing section 33 from the information managed by line state managing section 35. In this case, the extracted information includes "receiving" for L2, and "empty" for other lines.

Next, line state control section 34 selects call processing based on the states of the lines extracted from line state managing section 35 and pressed button type 201 sent from mobile station 10a. In this case, since pressed button type 201 is L2 button, it is determined that a user of mobile station 10a desires to answer the incoming call through the line set with line key L2.

Thereafter, call control section 32 performs response processing to the incoming call through the line set with line key L2 under the control of line state control section 34, thereby responding to the incoming call through the line set with line key L2.

Figure 8:
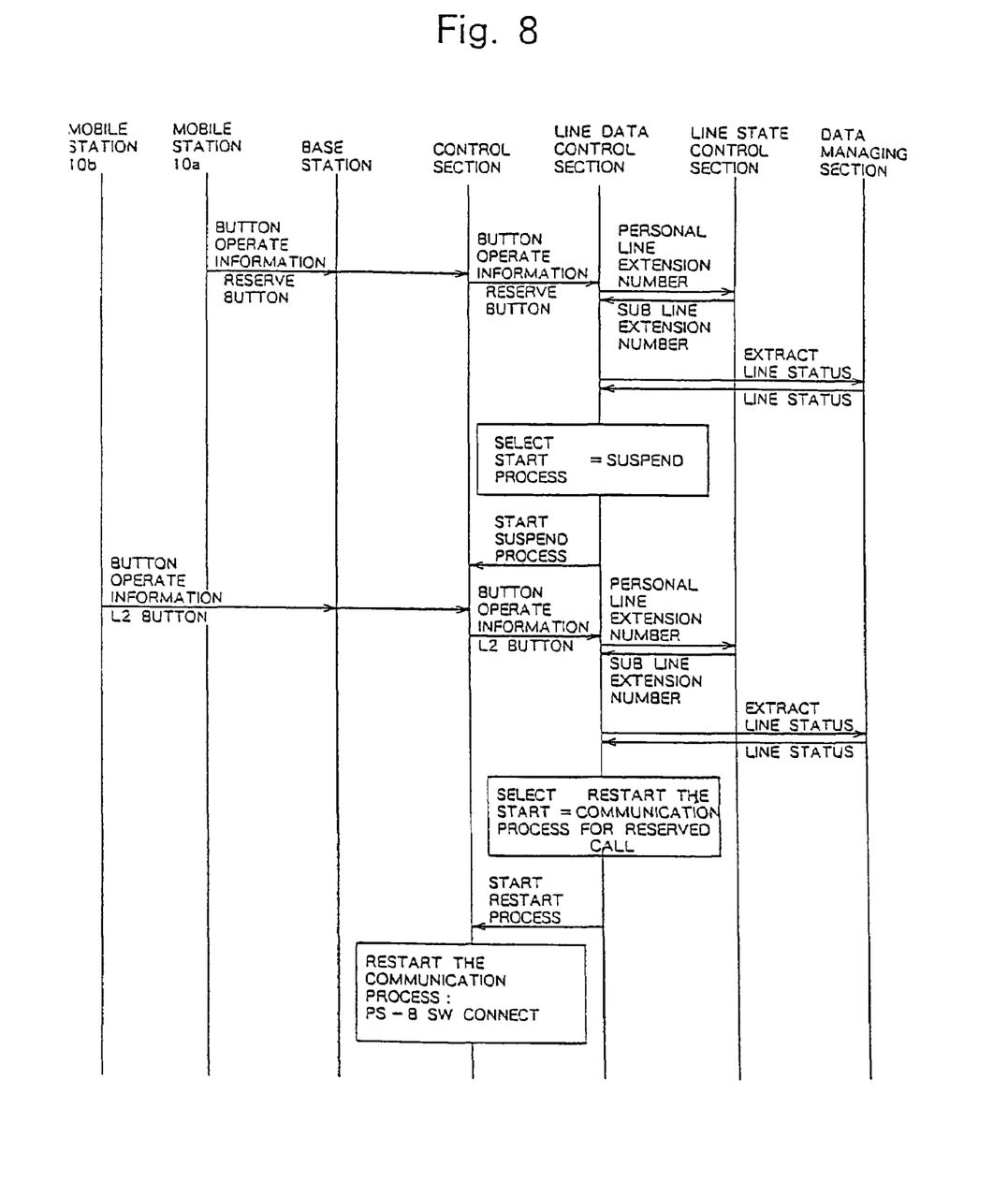
FIG. 8 is a diagram for explaining an example of call control operations in the private branch exchange system shown in FIG. 1 to FIG. 4.

Next, description is made for the operations when a user suspends a call at mobile station 10a and then takes the call again at another mobile station 10b to continue the communication, with reference to FIG. 8.

When reserve button 13 is pressed during a call using a subline set with line key L2 at mobile station 10a, such information as shown in FIG. 4 is sent from mobile station 10a to exchange station 30 through base station 20. In this case, pressed button type shown in FIG. 4 is the reserve button, and an associated extension number is the extension number for setting the personal line at mobile station 10a.

The information sent to exchange station 30 is sent to line state control section 34 through call control section 32 in exchange station 30.

Line state control section 34 extracts all the extension numbers set for mobile stations 10a from the data managed by data managing section 33 based on the information sent from mobile station 10a. Specifically, all the extension numbers for setting sublines stored in mate line list 103 accompanied with the extension number for setting the personal line at mobile station 10a are extracted.

Next, line state control section 34 extracts the states of the lines set with the extension numbers extracted from data managing section 33 from the information managed by line state managing section 35. In this case, the extracted information includes "communicating" for L2, and "empty" for other lines.

Next, line state control section 34 selects call processing based on the states of the lines extracted from line state managing section 35 and pressed button type 201 sent from mobile station 10a. In this case, since pressed button type 201 is the reserve button, it is determined that a user of mobile station 10a desires to suspend a call.

Thereafter, call control section 32 performs suspending processing of the call set with line key L2 under the control of line state control section 34, thereby suspending the call set with line key L2.

When line key L2 is pressed at mobile station 10b which can set the line with line key L2 similarly to mobile station 10a in a state where the call set with line key L2 at mobile station 10a is suspended, such information as shown in FIG. 4 is sent from mobile station 10b to exchange station 30 through base station 20. In this case, pressed button type 201 shown in FIG. 4 is L2 button, and an associated extension number is the extension number for setting the personal line at mobile station 10b.

The information sent to exchange station 30 is sent to change state control section 34 through call control section 32 in exchange station 30.

Line state control section 34 extracts all the extension numbers set for mobile stations 10b from the data managed by data managing section 33 based on the information sent from mobile station 10b. Specifically, all the extension numbers for setting sublines stored in mate line list 103 accompanied with the extension number for setting the personal line at mobile station 10b are extracted.

Next, line state control section 34 extracts the states of the lines set with the extension numbers extracted from data managing section 33 from the information managed by line state managing section 35. In this case, the extracted information includes "suspending" for L2, and "empty" for other lines.

Next, line state control section 34 selects call processing based on the states of the lines extracted from line state managing section 35 and pressed button type 201 sent from mobile station 10b. In this case, since pressed button type 201 is L2 button, it is determined that a user of mobile station 10b desires to restart the communication using the line set with line key L2.

Thereafter, call control section 32 performs processing for originating the call set with line key L2 under the control of line state control section 34, thereby restarting the communication of the call set with line key L2.

OTHER EMBODIMENTS

While an extension number is common only to a plurality of mobile stations in the aforementioned embodiment, a general wired extension may be set for a mobile station to realize a private branch exchange system which also serves as a general wired extension.

Thus, when a user during a call using a general extension desires to move to a different location with the call maintained, the user may once suspend the call using the general extension and then restart the call at a mobile station to continue the call.

While a preferred embodiment of the present invention has been described using specific terms, such description is for illustrative purposes only, and it is to be understood that changes and variations may be made without departing from the spirit or scope of the following claims.

What is claimed is:

1. A private branch exchange system comprising:
    a plurality of mobile stations each having a numeric keypad, a plurality of extension numbers and a corresponding plurality of different line keys physically present thereon and actuatable by an operator for selecting among any one of said plurality of extension numbers for making a call, said plurality of different line keys being separate and distinct from said numeric keypad;
    a base station wirelessly connected to said plurality of mobile stations; and
    an exchange station for performing call control of said plurality of mobile stations through said base station.

2. The private branch exchange system according to claim 1, wherein at least one of said plurality of extension numbers set for said plurality of mobile stations is a unique extension number for each of said plurality of mobile stations.

3. The private branch exchange system according to claim 2, wherein said plurality of mobile stations each have line key buttons for setting said plurality of lines.

4. The private branch exchange system according to claim 3, wherein said exchange station comprises:
    a call control section for performing call control of said plurality of mobile stations;
    a data managing section for managing information for each of said plurality of extension numbers;
    a line state managing section for managing a state of each of said plurality of lines; and
    a line state control section for sending a direction for performing call control to said call control section based on the information for each extension number managed by said data managing section and the state of the line managed by said line state managing section,
    wherein said call control section performs call control of said plurality of mobile sections based on the direction sent from said line state control section.

5. The private branch exchange system according to claim 4, wherein said line state control section comprises:
    means for sending a direction to perform call control to said call control section; and
    means for rewriting the state of the line managed by said line state managing section based on the call control.

6. The private branch exchange system according to claim 2, wherein said plurality of mobile stations each have line key buttons for setting said plurality of lines.

7. The private branch exchange system according to claim 2, wherein said exchange station comprises:
    a call control section for performing call control of said plurality of mobile stations;
    a data managing section for managing information for each of said plurality of extension numbers;
    a line state managing section for managing a state of each of said plurality of lines; and
    a line state control section for sending a direction for performing call control to said call control section based on the information for each extension number managed by said data managing section and the state of the line managed by said line state managing section,
    wherein said call control section performs call control of said plurality of mobile sections based on the direction sent from said line state control section.

8. The private branch exchange system according to claim 7, wherein said line state control section comprises:
    means for sending a direction to perform call control to said call control section; and
    means for rewriting the state of the line managed by said line state managing section based on the call control.

9. The private branch exchange system according to claim 8, wherein said data managing section manages data comprising:
    said extension number;
    identification information for indicating if said extension number is a unique extension number of said mobile station; and
    a list for storing, when said extension number is a unique extension number of said mobile station, all other extension numbers set for a mobile station which has said extension number as its unique extension number, and for storing, when said extension number is not a unique extension number of said mobile station, unique extension numbers of all mobile stations which have said extension number set,
    the number of sets of said data being equal to the number of the plurality of extension numbers.

10. The private branch exchange system according to claim 9, wherein said line state control section comprises:
    means for acquiring, from a unique extension number of said mobile station, other extension numbers set for a mobile station which has the extension number as its unique extension number using the information managed by said data managing section;
    means for acquiring, from an extension number other than a unique extension number of said mobile station, a unique extension number of a mobile station which has the extension number set;
    means for extracting the state of the lines managed by said line state managing section based on the acquired extension number; and
    means for sending a direction to perform call control to said call control section based on the state of the line.

11. The private branch exchange system according to claim 10, wherein said plurality of mobile stations each have an extension number for which a line in the wired private branch exchange system is set.

12. The private branch exchange system according to claim 7, wherein said data managing section manages data comprising:
    said extension number;
    identification information for indicating if said extension number is a unique extension number of said mobile station; and
    a list for storing, when said extension number is a unique extension number of said mobile station, all other extension numbers set for a mobile station which has said extension number as its unique extension number, and for storing, when said extension number is not a unique extension number of said mobile station, unique extension numbers of all mobile stations which have said extension number set, the number of sets of said data being equal to the number of the plurality of extension numbers.

13. The private branch exchange system according to claim 12, wherein said line state control section comprises:

means for acquiring, from a unique extension number of said mobile station, other extension numbers set for a mobile station which has the extension number as its unique extension number using the information managed by said data managing section;

means for acquiring, from an extension number other than a unique extension number of said mobile station, a unique extension number of a mobile station which has the extension number set;

means for extracting the state of the lines managed by said line state managing section based on the acquired extension number; and means for sending a direction to perform call control to said call control section based on the state of the line.

14. The private branch exchange system according to claim 13, wherein said plurality of mobile stations each have an extension number for which a line in the wired private branch exchange system is set.

15. The private branch exchange system according to claim 2, wherein said exchange station comprises:

a call control section for performing call control of said plurality of mobile stations;

a data managing section for managing information for each of said plurality of extension numbers;

a line state managing section for managing a state of each of said plurality of lines; and a line state control section for sending a direction for performing call control to said call control section based on the information for each extension number managed by said data managing section and the state of the line managed by said line state managing section, wherein said call control section performs call control of said plurality of mobile sections based on the direction sent from said line state control section.

16. The private branch exchange system according to claim 15, wherein said line state control section comprises:

means for sending a direction to perform call control to said call control section; and means for rewriting the state of the line managed by said line state managing section based on the call control.

17. The private branch exchange system according to claim 1, wherein said plurality of mobile stations each have line key buttons for setting said plurality of lines.

18. The private branch exchange system according to claim 17, wherein said exchange station comprises:

a call control section for performing call control of said plurality of mobile stations;

a data managing section for managing information for each of said plurality of extension numbers;

a line state managing section for managing a state of each of said plurality of lines; and a line state control section for sending a direction for performing call control to said call control section based on the information for each extension number managed by said data managing section and the state of the line managed by said line state managing section, wherein said call control section performs call control of said plurality of mobile sections based on the direction sent from said line state control section.

19. The private branch exchange system according to claim 1, wherein said exchange station comprises:

a call control section for performing call control of said plurality of mobile stations;

a data managing section for managing information for each of said plurality of extension numbers;

a line state managing section for managing a state of each of said plurality of lines; and a line state control section for sending a direction for performing call control to said call control section based on the information for each extension number managed by said data managing section and the state of the line managed by said line state managing section, wherein said call control section performs call control of said plurality of mobile sections based on the direction sent from said line state control section.

20. A private branch exchange system comprising:

a plurality of mobile stations;

a base station wirelessly connected to said plurality of mobile stations;

an exchange station for performing call control of said plurality of mobile stations through said base station, wherein each of said plurality of mobile stations has the same extension number as that of one or more predetermined other mobile station; and wherein said plurality of mobile stations each have a numeric keypad, a plurality of extension numbers, and a corresponding plurality of different line keys physically present thereon and actuatable by an operator for selecting among any one of said plurality of extension numbers for making a call, said plurality of different line keys being separate and distinct from said numeric keypad.

21. The private branch exchange system according to claim 20, wherein at least one of said plurality of extension numbers set for said plurality of mobile stations is a unique extension number for each of said plurality of mobile stations.

22. The private branch exchange system according to claim 21, wherein said plurality of mobile stations each have line key buttons for setting said plurality of lines.

23. The private branch exchange system according to claim 21, wherein said exchange station comprises:

a call control section for performing call control of said plurality of mobile stations;

a data managing section for managing information for each of said plurality of extension numbers;

a line state managing section for managing a state of each of said plurality of lines; and a line state control section for sending a direction for performing call control to said call control section based on the information for each extension number managed by said data managing section and the state of the line managed by said line state managing section, wherein said call control section performs call control of said plurality of mobile sections based on the direction sent from said line state control section.

24. The private branch exchange system according to claim 23, wherein said line state control section comprises:

means for sending a direction to perform call control to said call control section; and means for rewriting the state of the line managed by said line state managing section based on the call control.

25. The private branch exchange system according to claim 20, wherein said plurality of mobile stations each have line key buttons for setting said plurality of lines.

26. The private branch exchange system according to claim 20, wherein said exchange station comprises:
- a call control section for performing call control of said plurality of mobile stations;
- a data managing section for managing information for each of said plurality of extension numbers;
- a line state managing section for managing a state of each of said plurality of lines; and
- a line state control section for sending a direction for performing call control to said call control section based on the information for each extension number managed by said data managing section and the state of the line managed by said line state managing section, wherein said call control section performs call control of said plurality of mobile sections based on the direction sent from said line state control section.

\* \* \* \* \*